United States Patent

[11] 3,631,390

| [72] | Inventor | Thomas S. B. Murphy<br>991 Ridgefield Road, Wilton, Conn. 06897 |
| --- | --- | --- |
| [21] | Appl. No. | 878,608 |
| [22] | Filed | Nov. 21, 1969 |
| [45] | Patented | Dec. 28, 1971 |

[54] VEHICLE MOVEMENT CONDITION SAFETY LIGHT SYSTEM
2 Claims, 2 Drawing Figs.

[52] U.S. Cl. .................................................. 340/62, 340/66, 340/72, 340/263
[51] Int. Cl. ............................................................... B60q 1/54
[50] Field of Search ............................................ 340/62, 66, 67, 71, 72, 76, 81, 70, 262

[56] References Cited
UNITED STATES PATENTS

| 2,794,082 | 5/1957 | Germaine | 340/70 X |
| --- | --- | --- | --- |
| 2,900,465 | 8/1959 | Weiss | 340/262 X |
| 3,229,249 | 1/1966 | Brenner | 340/62 X |
| 3,521,232 | 7/1970 | Black | 340/62 |

*Primary Examiner*—Alvin H. Waring
*Attorney*—Shoemaker & Mattare

ABSTRACT: A vehicle has a plurality of stroboscopic lights mounted thereon. An electrical circuit is provided for operating the stroboscopic lights and includes a source of electrical energy as well as speed-responsive switch means which is responsive to the speed of movement of the vehicle for causing the stroboscopic lights to be illuminated in accordance with the speed of the vehicle when the vehicle is traveling in a forward direction. Control switch means are provided for selectively operating the stroboscopic lights in different manners in accordance with whether the vehicle is at rest, is in reverse, is to make a left turn, is to make a right turn, or is traveling forward and making no turns.

INVENTOR
THOMAS S.B. MURPHY
BY Shoemaker and Mattare
ATTORNEYS 3,631,390

VEHICLE MOVEMENT CONDITION SAFETY LIGHT SYSTEM

BACKGROUND OF THE INVENTION

The present invention relates to vehicle safety light means which is particularly adapted for use with automotive vehicles. Automobiles now in use employ conventional lights at the rear of the vehicle which are adapted to indicate application of the brakes of the vehicle as well as to indicate whether the vehicle is about to make a right turn or a left turn.

Such conventional lights at the rear of an automobile are suitable for use in urban areas and suburban areas. However, when traveling in the country or on high-speed highways, it is desirable to provide additional safety light means at the rear of the vehicle in order that the operators of following vehicles will be readily apprised of the fact that the vehicle is at rest, is in reverse, or is traveling forward, and if traveling forward, whether the vehicle is accelerating, decelerating, or traveling at normal speed. Additionally, it is desirable to provide a safety light means which will advice whether or not the vehicle is to make a right or a left hand turn, or whether no turns are to be made.

SUMMARY OF THE INVENTION

In the present invention, stroboscopic light means is provided at the rear of a vehicle, such as an automobile, this stroboscopic light means preferably including a plurality of stroboscopic lights so as to impart a maximum amount of information to following vehicle operators.

In the disclosed embodiment, three separate stroboscopic lights are employed and are arranged laterally across the rear of the vehicle so that the left-hand stroboscopic light is adapted to indicate when a left turn is to be made, while a right-hand stroboscopic light is employed to indicate when a right turn is to be made. The centrally located stroboscopic light indicates that the operator of the vehicle does not anticipate making any turns.

An electrical circuit is provided for operating the stroboscopic lights and includes a source of electrical energy as well as speed-responsive switch means which is responsive to the speed of movement of the vehicle for causing the stroboscopic light means to be illuminated in accordance with the speed of the vehicle. This speed-responsive responsive switch means may be operatively associated with various portions of the vehicle, such as the drive shaft, a wheel or axle, or a speedometer cable.

First and second pulse-generating means are provided for generating pulses at different timed intervals for indicating whether the vehicle is at rest or in reverse.

Control switch means are provided for selectively connecting either of the pulse-generating means or the speed-responsive switch means to the stroboscopic lights.

A first switch connects the first pulse-generating means to the stroboscopic lights for operating such lights at predetermined intervals when the vehicle is at rest. A second switch means is provided for connecting the second pulse-generating means to the stroboscopic lights for operating such lights at predetermined timed intervals when the vehicle is in reverse. The intervals at which the stroboscopic lights are illuminated in stop and reverse are sufficiently different so that the operator of a following vehicle is readily apprised as to whether the vehicle is either at rest or in reverse.

The control switch means includes further switches for selectively connecting different ones of the stroboscopic light means to the speed-responsive switch means so that the stroboscopic lights indicate whether the vehicle is to make a left turn, a right turn, or whether no turns are to be made.

DESCRIPTION OF THE PREFERRED EMBODIMENT

Figure 1:
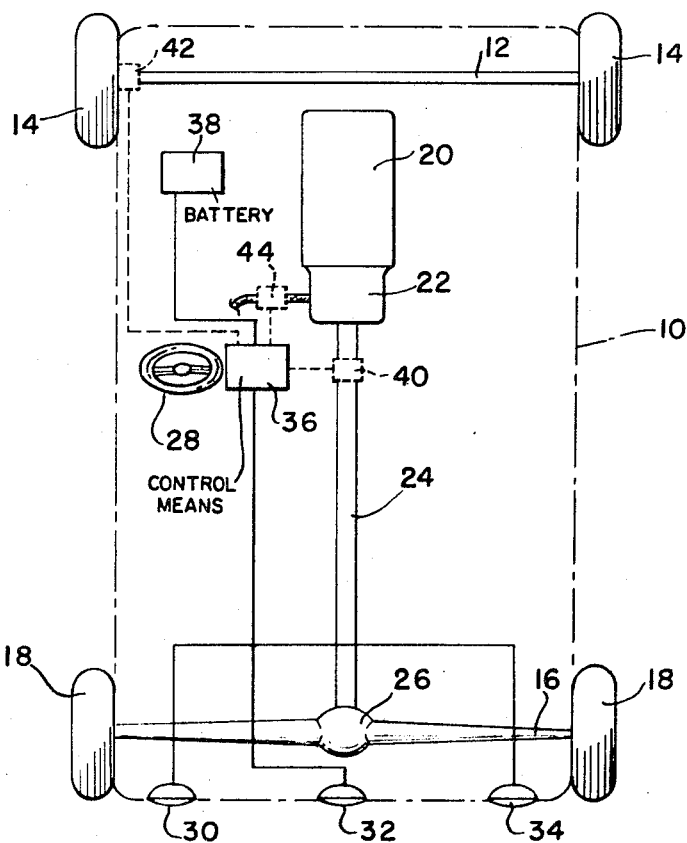
FIG. 1 is a schematic illustration of the safety light means of the invention as mounted on a conventional automotive vehicle.

Referring now to the drawing wherein like reference characters designate corresponding parts throughout the several views, as seen in FIG. 1, a conventional automotive vehicle is indicated schematically by phantom line 10, the vehicle including a front axle 12 having wheels 14 rotatably journaled at the opposite ends thereof, and also including a rear axle 16 having wheels 18 journaled at the opposite ends thereof.

The vehicle includes a conventional internal combustion engine 20 operatively connected with a transmission 22 which in turn is connected with a drive shaft 24. The rear end of the drive shaft is connected through the usual differential 26 with the rear axle. A conventional steering wheel 28 is also provided.

Three stroboscopic lights 30, 32 and 34 of the type commonly employed in conventional stroboscopes are mounted at the rear of the vehicle in laterally spaced relationship as indicated on the drawing. These lights may be mounted at any suitable location, preferably at approximately the same level as the usual lights mounted on the vehicle. These stroboscopic lights are connected with control means 36 preferably mounted on or adjacent the steering column associated with the steering wheel so that the control switches hereinafter described are readily accessible to the operator of the vehicle. The vehicle is provided with a battery 38 which serves to provide the power for the electrical circuit which operates the stroboscopic lights.

Speed-responsive switch means is connected in the electrical circuit, and three alternative locations of the speed-responsive switch means are diagrammatically indicated by dotted lines on FIG. 1, it being understood that only one of these switch means will generally be employed in actual practice. A first speed-responsive switch means 40 is disclosed as being operatively associated with the drive shaft 24. This switch means may be of any suitable type and may typically comprise a magnetic or microswitch which is operated by rotation of the drive shaft.

A second speed-responsive switch means 42 is indicated as being operatively associated with one of the front wheels 14 of the vehicle so that the switch means is operated in accordance with rotation of the associated wheel.

A third speed-responsive switch means 44 is illustrated as being operatively associated with the speedometer cable so that the switch means is operated in accordance with movement of the speedometer cable.

Figure 2:
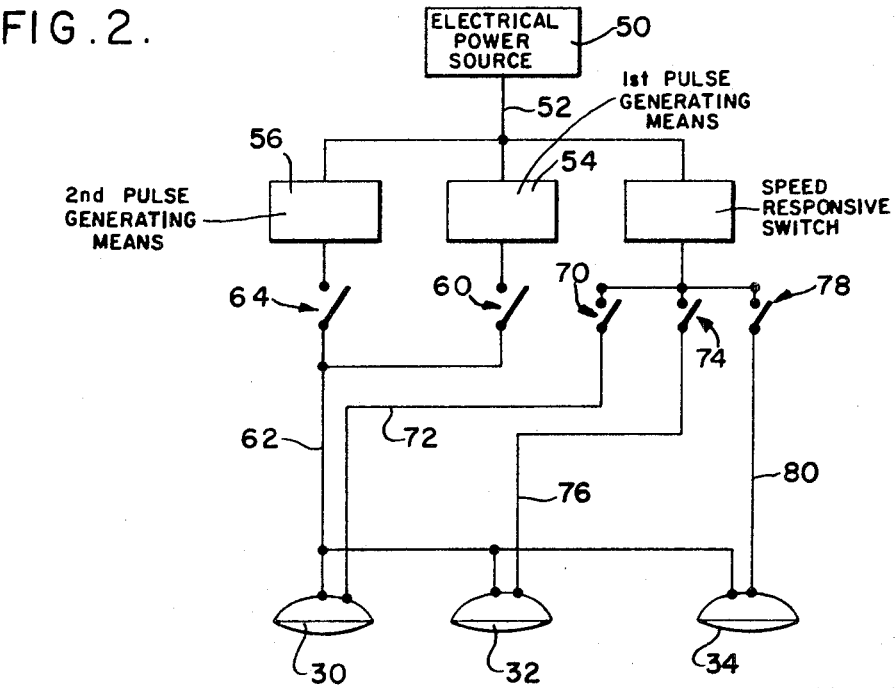
FIG. 2 is a schematic wiring diagram of the electrical circuit for operating the stroboscopic lights of the present invention.

Referring now to FIG. 2, the electrical circuit for operating the stroboscopic lights includes a power source 50. This power source includes the battery previously described as well as suitable mechanism for converting the 12-volt power of the battery into a 100-volt, 500-milliamp output.

The power source is connected by lead means 52 with one of the aforementioned speed-responsive switches as well as a first pulse-generating means 54 and a second pulse-generating means 56, the speed-responsive switch as well as the pulse-generating means being connected in parallel with one another. Each of these pulse-generating means may, for example, comprise an RC network. Pulse generator 54 is adapted to provide pulses so as to cause flashes of the connected stroboscopic lights at a rate of two flashes per second with a 1-second interval when the vehicle is standing still. Pulse generator 56 provides pulses which are adapted to cause the connected stroboscopic lights to flash at a rate of three flashes per second with a 1-second interval when the vehicle is in reverse.

A first control switch 60 is adapted to connect pulse generator 54 through further lead means 62 with each of the stroboscopic lights 30, 32 and 34, and a second control switch 64 is adapted to connect pulse generator 56 through lead means 62 with each of the stroboscopic lights.

Switch 60 is closed when the vehicle is at rest while the remaining control switches remain open. On the other hand, switch 64 is closed when the vehicle is in reverse, the other switches remaining open. Switches 60 and 64 may be interconnected with the shift lever for the transmission so that switches 60 and 64 will be automatically opened and closed as the transmission is shifted, for example, into neutral or park in one case, or into reverse in the other case.

A further switch 70 is connected by additional lead means 72 with stroboscopic light 30, switch 70 being closed when the vehicle is to make a left-hand turn, thereby serving as a turn indicator light.

A control switch 74 is adapted to connect the speed-responsive switch through additional lead means 76 with stroboscopic light 32. Switch 74 is closed when it is anticipated that no turns are to be made by the vehicle while operating in a forward direction.

A further control switch 78 is adapted to connect the speed-responsive switch through additional lead means 80 to stroboscopic light 34. Switch 78 is closed when the vehicle is to make a right-hand turn so as to cause operation of stroboscopic light 34 which thereby serves as a turn indicator.

In operation, if the vehicle is either at rest or in reverse, each of the stroboscopic lights will blink at a standard rate as determined by the associated pulse generators to indicate that the vehicle is either at rest or in reverse.

When the vehicle is traveling forward and no turns are being made, switch 74 is closed and the stroboscopic light 32 will blink at a rate in accordance with the speed of the vehicle. As the vehicle accelerates in a forward direction, the rate of blinking of stroboscopic light 32 will increase until the vehicle reaches normal speed which will cause the stroboscopic light to glow continuously or, in other words, the stroboscopic light will be blinking at such a rate that the human eye will be unable to detect that the light is not continuously illuminated.

As the vehicle decelerates from normal speed, the rate of blinking of stroboscopic light 32 will gradually decrease, and accordingly, the operator of a following vehicle can readily determined whether the vehicle is accelerating, decelerating, or operating at normal speed.

If a left turn is to be made when traveling forwardly, switch 70 is closed operating stroboscopic light 30, and on the other hand, if a right turn is to be made, switch 78 is closed, thereby operating stroboscopic light 34.

Switches 70 and 78 may be operatively associated with the usual turn indicator lever of the vehicle so that stroboscopic lights 30 and 34 will be automatically operated by the same mechanism which operates the conventional turn indicator lights.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. In combination with a motor vehicle having ground-engaging wheel means, drive means operatively coupled with said wheels including an engine, a transmission and a drive shaft and operative to propel the vehicle forwardly and reversely at varying speeds, and speedometer means including a speedometer cable, and a normal vehicle lighting system including headlights, taillights, stoplights and turn-indicating lights, the improvement comprising safety light means comprising auxiliary stroboscopic light means mounted externally of the rear of the vehicle and including three laterally spaced-apart light means mounted adjacent the left side, the center and adjacent the right side of the vehicle, an electrical circuit for operating said stroboscopic light means, including a source of electrical energy, speed-responsive switch means in said circuit and operatively associated with one of said wheel means, drive shaft and speedometer cable so that said switch means is responsive to the movement thereof, first and second pulse-generating means in said circuit respectively generating pulses at different predetermined constant time intervals, lead means connecting said source with said speed-responsive switch means and said first and second pulse-generating means respectively, additional lead means separately connecting said speed-responsive switch means with each light means, further lead means separately connecting each of said first and second pulse-generating means with all of said light means, individual control switch means for each light means in said additional lead means for selectively energizing each light means, fist and second control switch means in said further lead means for selectively energizing all said light means responsive to either said first or second pulse-generating means respectively, one of said first and second switch control means being operative to energize said light means when the vehicle is at rest, the other of said first and second control switch means being operative to energize said light means when the vehicle is in reverse and said individual switch means being respectively operative to selectively energize said centrally located light means when said vehicle is moving forward and making no turn, to selectively energize said respective left side and right side light means when said vehicle is moving forward and turning to either the left or right respectively.

2. A safety light system for a vehicle having a conventional vehicular lighting system including headlights, taillights, stoplights and turn-indicating lights and being especially for use when the vehicle is travelling in open country or on high-speed highways to indicate vehicle movement conditions to operators of following vehicles, and comprising additional and stroboscopic light means mounted at the rear of the vehicle, an electrical circuit for energizing said stroboscopic light means including a source of electrical energy, first and second pulse-generating means in said circuit for pulsing said light means at respectively different predetermined constant time intervals, vehicle speed responsive switch means, and control switch means for selectively connecting said speed-responsive switch means or either of said pulse-generating means with said light means to respectively energize said light means when the vehicle is moving forward, to energize said light means at a time interval in accordance with one of said pulse-generating means when the vehicle is at rest and to energize said light means at a different time interval in accordance with the outer of said pulse-generating means when the vehicle is in reverse.

* * * * *